April 28, 1931.　　G. P. SPRINGFIELD　　1,803,078
AUTOMOBILE BUMPER
Filed Dec. 13, 1929　　2 Sheets-Sheet 1
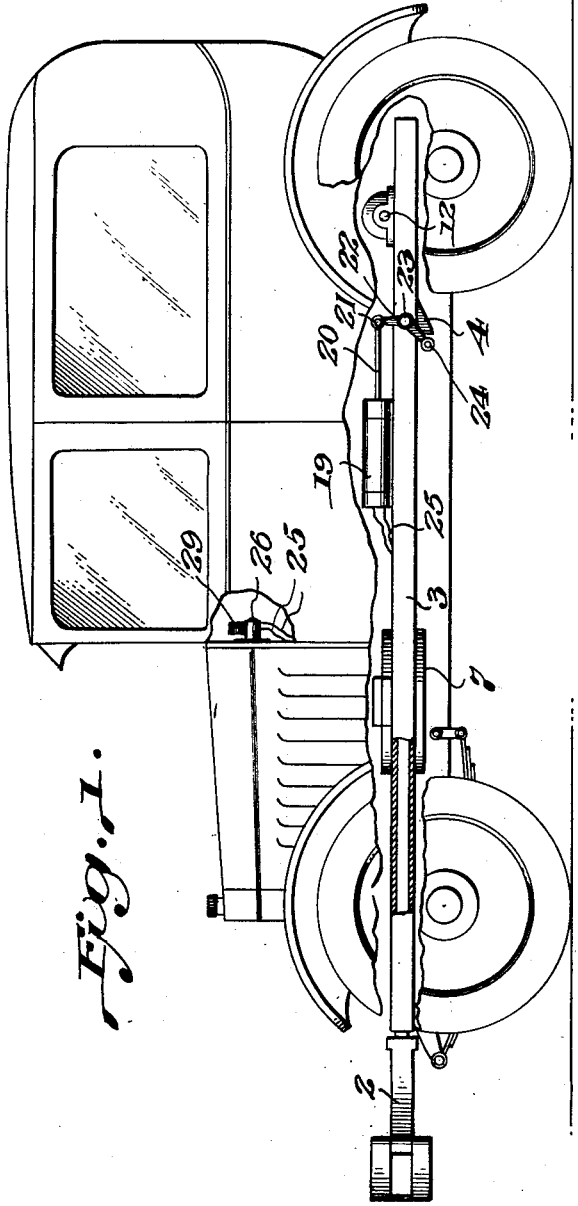
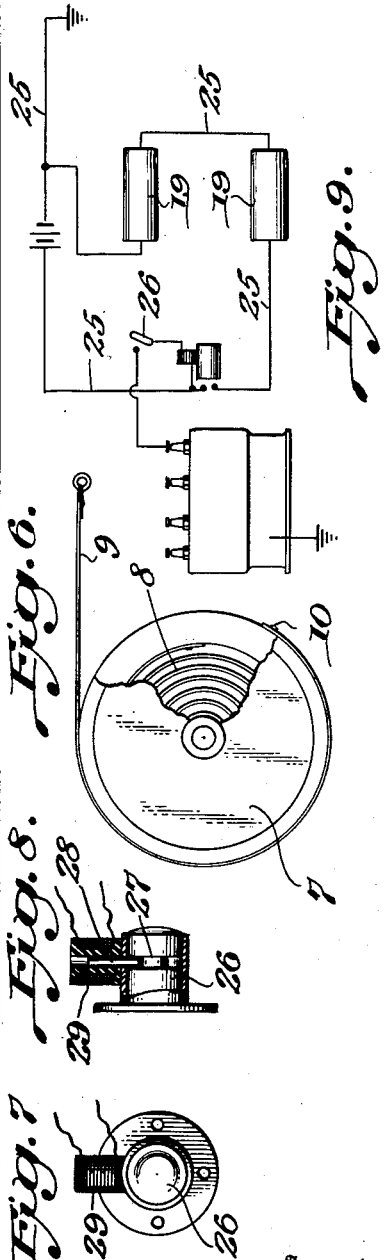
Inventor
Garland P. Springfield
By
Attorney April 28, 1931.  G. P. SPRINGFIELD  1,803,078
AUTOMOBILE BUMPER
Filed Dec. 13, 1929   2 Sheets-Sheet 2
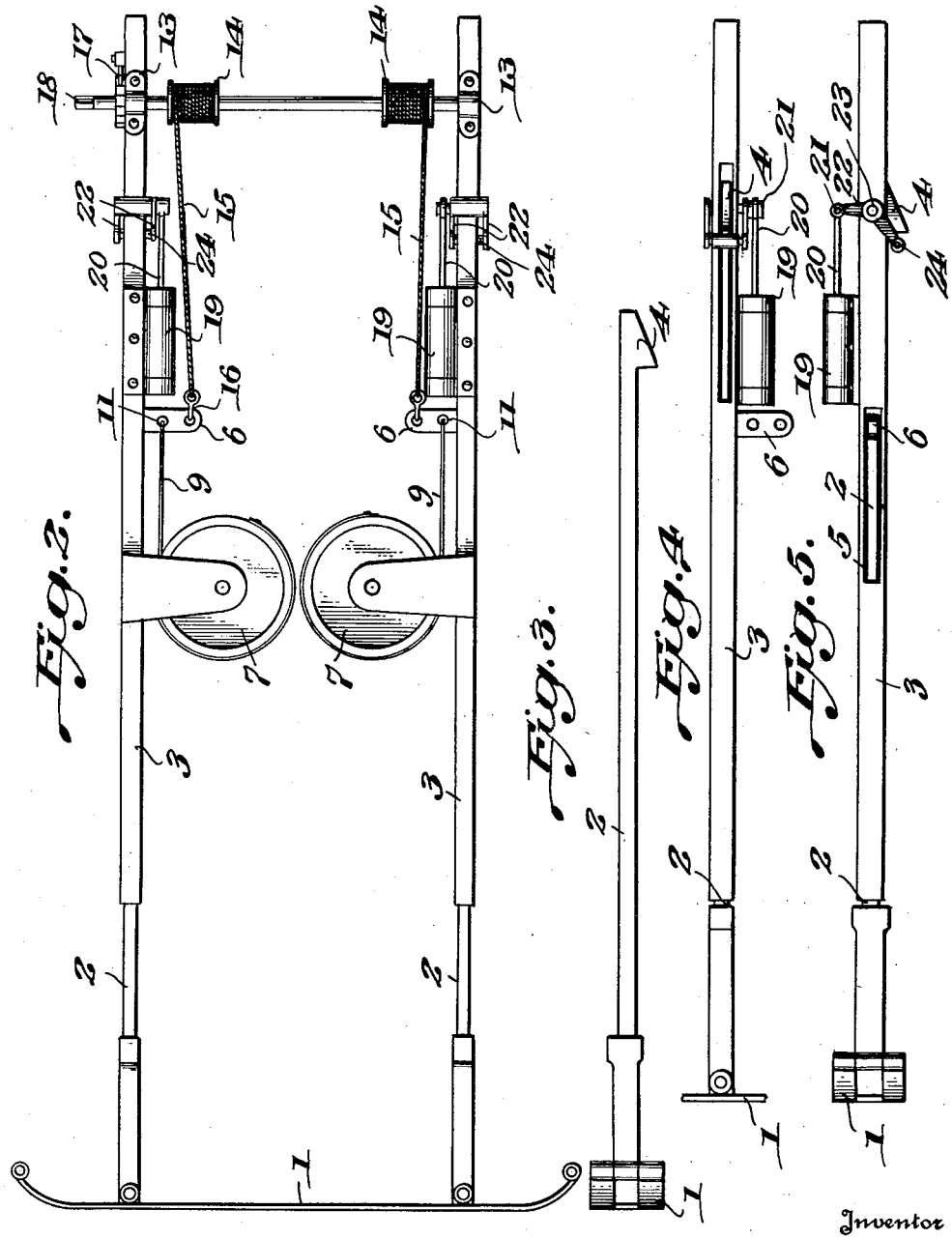

Patented Apr. 28, 1931

1,803,078

UNITED STATES PATENT OFFICE

GARLAND P. SPRINGFIELD, OF EVANSVILLE, INDIANA

AUTOMOBILE BUMPER

Application filed December 13, 1929. Serial No. 413,888.

The ordinary bumper, while protecting the car against light shocks, without appreciable injury to the car or its occupants, does not adequately meet requirements when the car is subjected to a heavy blow nor has it the adaptability to prevent shock and injury to the driver and passengers.

This defect is due to the lack of flexibility or cushioning effect of the bumper on account of the stiff steel employed in its construction and the lack of proper means for cushioning the blow.

My improved bumper has been designed to overcome the deficiencies of bumpers for automobiles and to provide means whereby the bumper will bodily yield, shift, or move under the force of the impact or collision and cushion the effect of the blow in such manner that the shock imparted to the occupants of the car will be relatively light as compared with the shocks to which they are subjected when an ordinary bumper is employed.

Another object is to provide an improved spring projected bumper which may be normally disposed in latched, retracted position and will have means whereby the driver of the car may instantly release the bumper, enabling it to be projected outwardly in advance of its normal position by the spring means, which spring means will also serve as a cushion to cushion the blow of the bumper as it retreats when it receives the blow.

Another object is to provide an inter-locking means between the controlling means aforesaid and the ignition switch of the automobile, whereby the controlling means will be locked out when the ignition switch is off and the engine of the car is not running, thus preventing the bumper from being tampered with by boys and mischievous persons.

Other objects are the provision of a spring projected and cushioned bumper, combined with retracting means by which the bumper may be returned to its normal retracted position, and also to provide improvements in respect to details of construction, as are hereinafter set forth.

In the accompanying drawings:

Figure 1, is a side elevation of an automobile, broken away, showing the invention;

Fig. 2, is a plan view of those parts which are carried by the frame or chassis;

Fig. 3, is a detail view of one of the rods;

Fig. 4, is a bottom view of one of the guides, the solenoid, latch, and allied parts;

Fig. 5, is a side view thereof;

Fig. 6, is a detail view, broken away, of one of the spring drums;

Fig. 7, is a front elevation of the controlling switch and interlocking device;

Fig. 8, is a side elevation, broken away, thereof; and

Fig. 9, is a diagram of the circuits.

The bumper proper 1, is of any preferred construction and may be of any standard make, if desired, as it is the manner in which the bumper is mounted and operated, and the construction therein involved, to which the invention pertains. The bumper 1 is carried by rods 2 extending longitudinally of the automobile and which are slidably mounted in elongated guides 3 suitably carried by the chassis of the car and extending longitudinally thereof.

The rods 2 are provided with hooked parts 4 by which the rods 2 and the bumper 1 are held in retracted position under normal conditions.

Projecting through slots 5 and extending longitudinally of the inner faces of the guides 3, and connected to the rods 2, are members or arms 6 to which the spring means and the retracting means are connected.

The spring means for projecting the rods 2 and the bumper 1 comprise drums 7 having helical springs 8 which actuate them, there being steel tapes or cables 9 which are connected to the drums at 10 and are adapted to wind upon them, said tapes or cables being attached to the members or arms 6 at 11.

The springs 8 are coiled in such fashion that the tendency of the drums 7 is to wind up the steel tapes or cables 9 and pull upon the arms 6 for the purpose of projecting the rods 2 and shifting the bumper 1 away from normal, retracted position.

Inasmuch as it is necessary to retract the rods 2 and the bumper 1 after they have been projected so that they may be disposed in normal position, there is provided a shaft 12 suitably journalled at 13 on the guides 3 and provided with drums 14 on which wind steel tapes or cables 15 which have suitable connections 16 to the arms or members 6. Pawl and ratchet means 17 constitute a holding device for holding the shaft 12 after the cables 15 have been wound up, until the hooks 4 have been locked by the means now to be described, whereupon the pawl may be disengaged from the ratchet in any suitable fashion as, for instance, by manipulating the shaft 12 to release the pawl and thereupon, by hand, disengaging the pawl so that there will be no interference with the free projection of the rods 2 and the bumper 1 when the releasing means is operated.

The shaft 12 may have any suitable handle or a squared part 18 to which a crank may be applied.

Mounted on the guides 3 are solenoids 19 whose armatures have extensions or pitmen 20 pivoted at 21 to bell-crank latches 22 which are pivotally mounted at 23 on the guides 3. The latches 22 are duplex and the duplex parts are connected by a crosspiece 24 which is adapted to lie in front of the hook 4, in each instance, thereby holding the rods 2 in retracted position against the tension of the springs 8.

The solenoids 19 are in circuits 25 which include the battery of the car and a push button switch 26, mounted in a suitable position convenient to the driver.

The push button 26 has a peripheral slot 27 in which is received the end of an armature 28 which is under the control of a small solenoid 29. The solenoid 29 is included in the circuit of the usual ignition switch for the engine of the automobile and consequently is normally deenergized when the ignition is off.

When the ignition switch for the engine is turned on, the energization of the solenoid 29 results, whereupon the armature 28 is thrown upwardly, thus freeing the push button 27, permitting the latter to be operated.

When the push button 27 is operated, the circuit 25 is closed, the solenoids 19 are energized, the armatures thereof are drawn into the solenoids, the pitmen 20 are actuated and rock the bell cranks 22, thereby releasing the hooks 4 and permitting the springs 8 and the drums 7 to project the rods 2 forwardly, thus positioning the bumper 1 ahead of the car to a suitable extent.

If the bumper 1 now strikes an object or if it is struck by another car, the rods 2 will slide into the guides 3 against the tension of the springs 8 and thus the blow is cushioned which greatly minimizes the shock to which the occupants of the car are subjected, thus materially lessening the danger of the occupants being thrown against the windows or windshield of the car or thrown out of the car.

It will be understood that the bumper 1 is normally kept in its retracted position and that the driver only projects the bumper 1 when he sees danger of a collision is imminent.

To reset the bumper, the shaft 12 is turned until the bell cranks 22 re-engage the hooks 4, whereupon the pawl of the pawl and ratchet mechanism is released in any suitable manner, as previously explained.

What I claim is:

1. The combination with a projectable and retractible automobile bumper, of spring operated means for projecting the bumper, means for retracting the bumper, electromagnetically operated means for holding the bumper in retracted position, and a switch controlling the operation of said electromagnetically operated means.

2. The combination with a projectable and retractible bumper mounted on an automobile, of spring actuated means for projecting the bumper, electro-magnetically operated means for locking the bumper in retracted position, a switch controlling said electromagnetically operated means, and means controlled by the ignition switch for the engine of the automobile constituting an interlock for the aforesaid bumper controlling switch which locks said switch against operation when the ignition switch is open and unlocks said switch when the ignition switch is closed.

3. The combination with a projectable and retractible bumper for an automobile, of spring actuated means for projecting said bumper, means for holding the bumper in retracted position, means for releasing said holding means, and an interlock between said releasing means and the ignition switch for the ignition circuit to the engine of the automobile whereby said releasing means is automatically locked against operation when the ignition switch is open and is unlocked when said ignition switch is closed.

4. The combination with a projectable and retractible bumper, of a spring drum for projecting said bumper, a windlass and cable for retracting said bumper against the action of said spring drum, a solenoid, a pivoted latch operated by said solenoid adapted for holding the bumper in retracted position, and a switch for operating said solenoid.

5. The combination with a projectable and retractible bumper, of a spring drum for projecting said bumper, a windlass and cable for retracting said bumper against the action of said spring drum, a solenoid, a pivoted latch operated by said solenoid adapted for holding the bumper in retracted position, a switch for operating said solenoid, and electro-magnetic means operated by the ignition switch of the automobile which normally locks the controlling switch for the bumper and releases said controlling switch when the ignition switch is closed.

In testimony whereof I affix my signature.

GARLAND P. SPRINGFIELD.